United States Patent [19]

Murr

[11] Patent Number: 5,635,895
[45] Date of Patent: Jun. 3, 1997

[54] REMOTE POWER COST DISPLAY SYSTEM

[76] Inventor: William C. Murr, P O Box 8840, Incline Village, Nev. 89450

[21] Appl. No.: 195,318

[22] Filed: Feb. 14, 1994

[51] Int. Cl.$^6$ .................................................. H04M 11/04
[52] U.S. Cl. ........................... 340/310.01; 340/870.02; 340/870.03; 340/870.05; 364/464.11
[58] Field of Search .................. 340/310 A, 870.02, 340/870.03, 870.05, 870.29; 364/483, 464, 464.04

[56] References Cited

U.S. PATENT DOCUMENTS 4,803,632   2/1989   Frew et al. .................. 364/464.04

*Primary Examiner*—Jeffery Hofsass
*Assistant Examiner*—Daryl C. Pope
*Attorney, Agent, or Firm*—Harris Zimmerman

[57] ABSTRACT

A remote electrical power meter display system for indicating to a consumer the actual costs associated with electrical power use includes two units: a wattmeter/transmitter for detecting instantaneous power consumption, and a remote reading unit for displaying the cost of electrical power at the instantaneous rate of power consumption. The wattmeter/transmitter includes an inductive coil pickup operatively connected to each hot lead of the utility service of a premises installation, and a voltage pickup is coupled to each hot lead and ground to detect the voltage delivered to the customer installation. A sample and hold circuit converts the voltage and current values to digital signals and feeds them to a calculator device which generates an instantaneous power use signal. This signal is fed to a carrier current transmitter which generates a coded carrier current signal indicative of the power consumption that is fed into the wiring of the customer installation to be transmitted throughout the customer's premises. The remote reading unit is plugged into any power outlet in the premises to provide a display of the cost of power consumption of the entire customer installation at any instant. The remote reading unit includes a carrier current receiver that decodes the signal from the wattmeter and a clock/calendar module and a power cost look-up table that stores power rate data as a function of time of day and date. The power rate data and power consumption data are fed to a calculator device, which generates a signal indicative of the cost of power used at the instant of sampling and transmits the signal to a display device. The sample and hold circuit is operated reiteratively and frequently, to inform the consumer on a continuing basis of the cost of power consumed at the customer's premises.

7 Claims, 2 Drawing Sheets

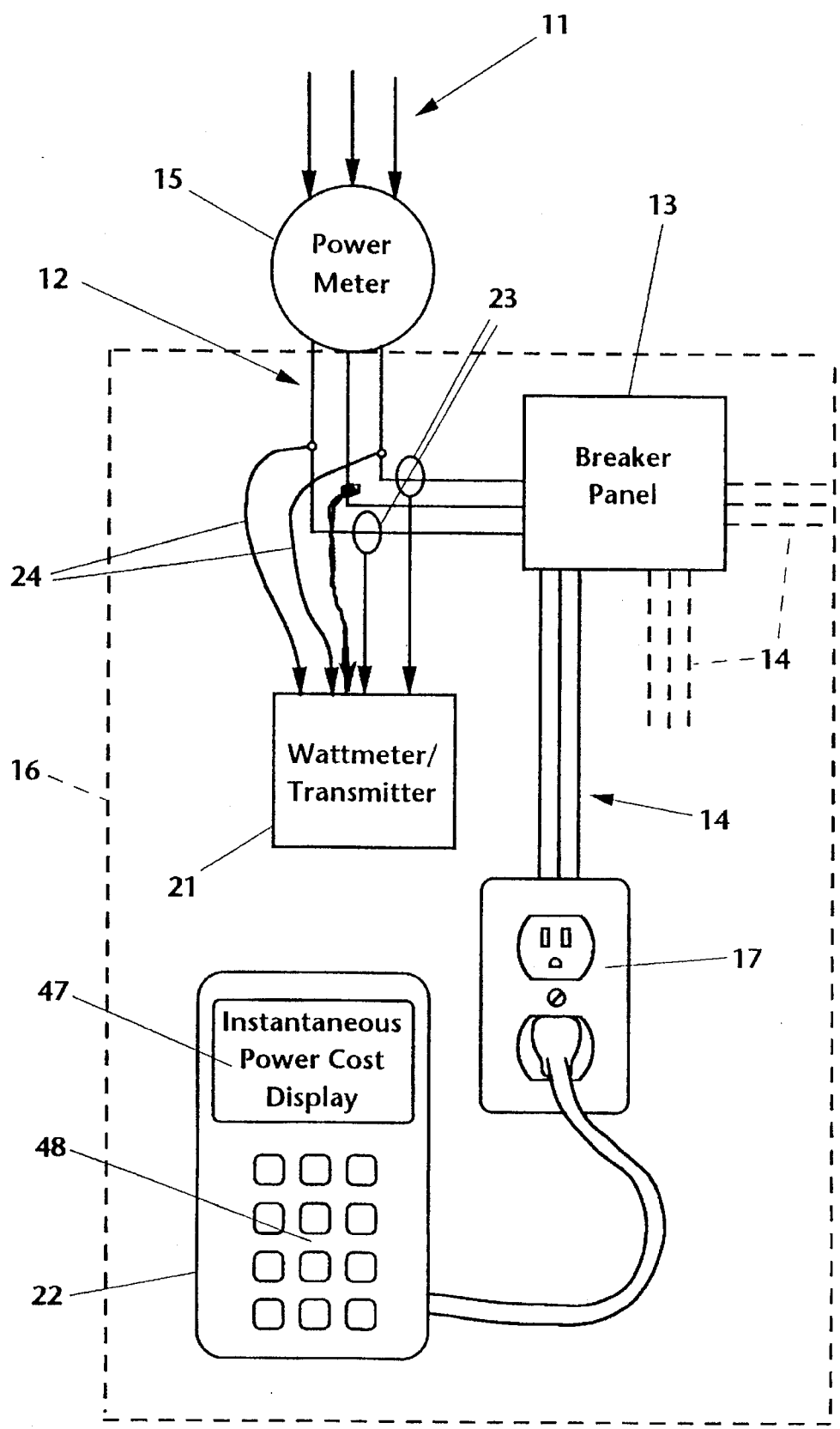
Figure_1

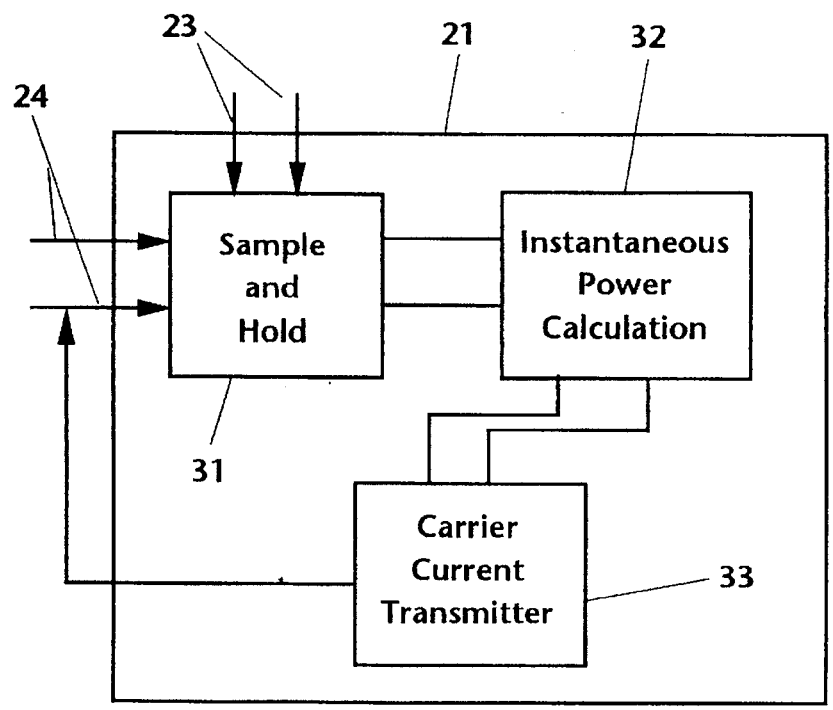
Figure_2
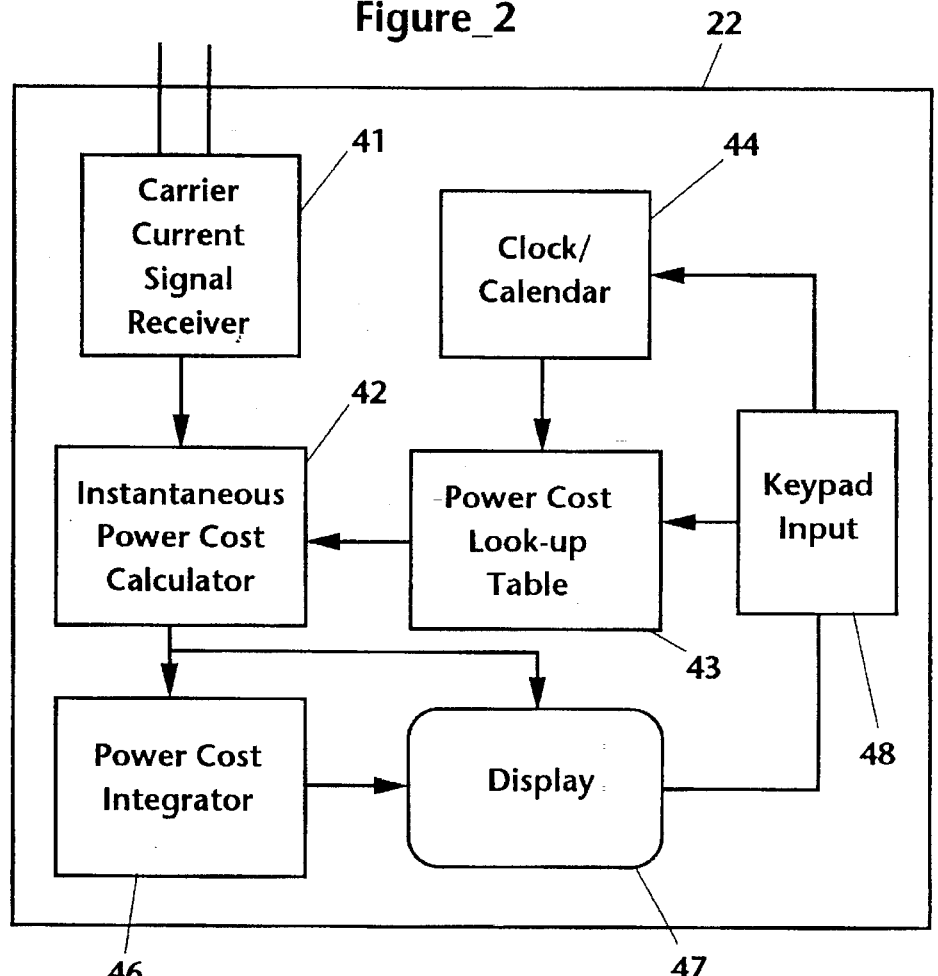
Figure_3

REMOTE POWER COST DISPLAY SYSTEM

BACKGROUND OF THE INVENTION

The present invention generally relates to remote power monitoring systems, and more particularly to a system that displays the instantaneous cost of power consumption.

There is a widespread awareness that the consumption of electrical power is increasing faster than the installed generating capacity in the United States, and that eventually there will be shortages of electrical power in many areas. Many utility companies have attempted to mitigate these circumstances by encouraging conservation of electrical power, although conservation can lead to a reduction in demand and may contravene the profit motive of a utility by reducing revenue. Conservation measures may include the use of energy efficient appliances and lighting, as well as deferring consumption to non-peak load periods. Some utility companies have adopted programs that reward the installation of insulation in homes and other buildings to reduce the energy consumed in heating and airconditioning. These large-scale conservation measures have had moderate success in reducing electrical power demand.

One aspect of electrical power conservation that is poorly exploited is education of consumers regarding the actual costs of operating lighting, appliances, heating and air conditioning. Although many individuals recognize that there is some cost involved in operating electrical devices, there is a notable lack of awareness of the specific cost associated with a particular appliance, heating device, or tool. Most consumers have a poor understanding of the relationship between power ratings in watts, power consumption in kilowatt-hours, and cost calculated in pennies per kilowatt-hour. Moreover, they generally do not pay attention to progressive rate structures that increase the cost per kilowatt-hour in accordance with the level of consumption (sometimes termed "lifeline" rates), nor do they schedule their power consumption to avoid peak load times.

For example, many individuals operate lighting and air conditioning systems in rooms and areas that are not occupied for many hours at a time, without thinking of the actual cost of this activity. Likewise, appliances such as dishwashers, laundry washers and dryers, baking and cooking appliances, and the like could be operated selectively during non-peak load periods. Instead, most individuals operate such devices based on convenience, whim, and impulse, without regard to cost or conservation. Thus there is an unmet need in the prior art for a system that will apprise individuals, particularly home dwellers, of the actual cost of the electrical power they are consuming at any given time. Such a system would result not only in more efficient use of appliances, lighting, heating, and air conditioning, but also in more effective application of progressive rate structures and peak load pricing surcharges.

There are known in the prior art many systems for remotely metering electrical power consumption by telemetering data to a central station, either over telephone lines or over the power transmission lines. These systems generally are designed for billing purposes, not for alerting the consumer to the actual cost of instantaneous power consumption. Although these prior art systems save money by eliminating manual utility meter reading, they do not interactively encourage conservation of electrical power in any direct manner.

SUMMARY OF THE PRESENT INVENTION

The present invention generally comprises a remote electrical power meter reading and display system for indicating to a consumer the actual costs associated with electrical power use. The system comprises two major components: a wattmeter/transmitter for detecting instantaneous power consumption, and a remote reading unit for displaying the cost of electrical power at the instantaneous rate of power consumption. Both units are designed to be inexpensive to manufacture and easy to install, so that they may be employed in widespread use among electrical utility customers.

The wattmeter/transmitter includes an inductive coil pickup operatively connected to each hot lead of the utility service between the standard power meter and the standard breaker panel of the customer installation. A voltage pickup is coupled to each hot lead and ground through ohmic connections to detect the voltage delivered to the customer installation. The inductive coil pickup detects the current carried in the respective hot lead, and the wattmeter includes a sample and hold circuit that converts the voltage and current values to digital signals and conducts them to a calculator device. The power factor (cosine of the phase angle between the voltage and current waveforms) is figured and the instantaneous power use is calculated and fed to a carrier current transmitter. A coded carrier current signal indicative of the power consumption is fed into the wiring of the customer installation to be transmitted throughout the customer's premises.

The remote reading unit is designed to be plugged into any power outlet in the customer premises to provide a display of the cost of power consumption of the entire customer installation at any instant. The remote reading unit includes a carrier current receiver that decodes the signal from the wattmeter and feeds the decoded signal to a device that calculates the cost of instantaneous power use. The remote reading unit also includes a clock/calendar module and a power cost look-up table that stores power rate data as a function of time of day and date. The power rate data is fed to the calculator device, which generates a signal indicative of the cost of power used at the instant of sampling and transmits the signal to a display device such as an LCD or LED display.

The sample and hold circuit of the wattmeter is operated reiteratively and frequently, so that the display of the remote reading unit is updated very often. Thus the consumer is made aware on a continuing basis of the cost of power consumed at the customer's premises.

The remote reading unit may also include an integrator that sums the instantaneous power cost data and accumulates power cost during an extended period, such as a utility billing period. A keypad on the remote reading unit may be used to select a display of instantaneous cost or on-going billing cost, as well as for inputting correct time and date data and utility rate structure data.

BRIEF DESCRIPTION OF THE DRAWING

FIG. 1 is a schematic block diagram depicting the relationship of the wattmeter/transmitter unit and remote reading unit of the invention with respect to the utility wiring of a customer's premises.

FIG. 2 is a schematic block diagram depicting the functioning of the wattmeter/transmitter unit of the invention.

FIG. 3 is a schematic block diagram depicting the functioning of the remote reading unit of the invention.

DESCRIPTION OF THE PREFERRED EMBODIMENT

The present invention generally comprises a remote electrical power meter reading and display system for indicating to a consumer the actual costs associated with electrical power use. With regard to FIG. 1, a typical electrical power delivery system generally includes a plurality of power conductors 11 connected to an industry standard power meter 15, and a plurality of conductors 12 extending from the power meter 11 to a circuit breaker panel 13 which connects to the circuits 14 that distribute electrical power throughout the customer's premises 16. The circuits 14 provide power to all of the electricity-consuming appliances and devices within the premises, either through hard-wired connections or through a plurality of plug receptacles, as represented by outlet 17.

The system of the invention includes two major components: a wattmeter/transmitter 21 for detecting instantaneous power consumption for the entire premises 16, and a remote reading unit 22 for displaying the projected cost of electrical power being consumed at the instantaneous rate determined by the wattmeter/transmitter 21. The wattmeter/transmitter 21 includes a plurality of pickups 23, each associated with one of the hot (current carrying) conductors extending from the power meter 15 to the breaker panel 13, for detecting the phase angle and magnitude of the current waveform carried in the respective conductor. The pickups 23 may comprise any form of inductive loop detector known in the prior art. In addition, the device 21 includes a plurality of voltage detectors 24 joined by ohmic connection to each of the conductors 12 to sense the phase angle and magnitude of the voltage waveform impressed on the conductors 12.

In general, the wattmeter/transmitter 21 receives the signals from the current detectors 23 and the voltage detectors 24, and calculates the instantaneous power usage within the premises 16. The device 21 transmits a coded signal indicative of the calculated power usage through the hard-wired detectors 24 to the electrical wiring system for the premises 16. The remote reading unit 22 is plug-connected to any power outlet 17 within the premises 16 to power the display which indicates the cost of power consumed throughout the premises at the instantaneous rate of power consumption. The plug connection of the remote reading unit 22 also permits the unit 22 to receive the coded signal from the wattmeter/transmitter 21, so that it may calculate the cost factor and generate the appropriate display. Thus the individuals dwelling within or using the premises 16 may be apprised of the cost of the electrical power being used, so that they may modify and optimize their power consumption in response to this information.

With regard to FIG. 2, the wattmeter/transmitter 21 includes a sample and hold circuit 31 that receives current and voltage signals from the detectors 23 and 24, respectively. The sample and hold circuit is operated reiteratively and periodically, and the sampled values are conducted to a calculating circuit 32 that determines the instantaneous power flow through the conductors 12 at each instant of sampling. The calculated power level is fed to a carrier current transmitter 33 that converts the power level to a coded carrier current signal. The carrier current signal is then conducted through the ohmic connections of the detectors 24, so that the signal is disseminated through all of the power delivery circuits 14.

It may be appreciated that some or all of the functions depicted as discrete blocks in FIG. 2 may be performed by a microprocessor under the direction of an appropriate algorithm stored in read-only memory. Such microprocessors are currently available from a wide variety of sources at low cost.

With regard to FIG. 3, the remote reading unit 22 includes a carrier current signal receiver 41 for detecting the coded carrier current signal transmitted by the wattmeter/transmitter 21 through the electrical wiring of the premises 16. The signal is decoded by the device 41 and fed to a calculator circuit 42. The remote reading unit 22 also includes a look-up table 43 stored in read-only memory which stores the cost per kilowatt-hour rate structure of the utility company providing the electrical power to the premises. The rate structure information is delivered to the calculator circuit 42, and the calculator circuit 42 forms the arithmetic product of the cost per kilowatt-hour and the instantaneous kilowatt-hour consumption, so that the instantaneous power cost is accurate with regard to progressive rate structures, peak load period surcharge fees, and other factors that deviate from a simple linear relationship between unit cost and number of units consumed. The output of the calculator circuit 42 is fed to a display 47 which indicates visually the projected cost of electrical power at the instantaneous rate of consumption.

The remote reading unit 22 may also include a clock/calendar module 44 which accurately counts current time and date information and feeds this information to the power cost look-up table 43 stored in memory. Thus the appropriate cost per kilowatt-hour for a given hour of the day and day of the week may be found in the look-up table based on the time and day information of the clock/calendar. In addition, a keypad 48 may be provided to enter the correct time and date into the clock/calendar 44, and to enter and update the power rate structure of the utility company providing the electrical power.

The remote reading unit 22 may further include a power cost integrator 46 to integrate and store the instantaneous power cost data, and feed this signal to the display 47 upon an appropriate key command from the keypad 48. The system thus may be used to indicate to the consumer the total electrical power bill up to the present time, and may be reset at the beginning of each billing period.

It may be appreciated that some or all of the functions depicted as block elements in FIG. 3 may be accomplished by a microprocessor guided by an appropriate algorithm stored in read-only memory. Indeed, the microprocessor may be similar to the device used in the wattmeter/transmitter unit 21 to enhance software compatibility.

The remote reading unit 22 may be plugged into any power outlet within the premises 16 to display the power cost data described above. Each system in adjacent or nearby premises is provided with a unique code for the carrier current transmitter, so that any carrier current signals conveyed through the power lines 11 to other premises cannot interfere or cause false readings. A simple microprocessor-based system can easily implement sufficient coding capacity to completely rule out such interference.

It should be noted that the system of the invention is completely site-specific in its operation, involving no communication with any central office or billing system. Thus there is no question of violating the privacy of the consumer in any moral or legal sense, nor any question of the consumer relinquishing any control over decisions regarding the amount of power consumed or the time at which it is used. Moreover, the system is designed to be used on an entirely voluntary basis.

I claim:

1. In an electrical utility service connection that incorporates a utility power meter at the interface between the utility power lines and the wiring to the customer premises, an electrical power consumption remote display system for indicating to a consumer within the customer premises the on-going cost of instantaneous electrical power consumption, including;

wattmeter/transmitter means for determining said instantaneous electrical power consumption at the customer premises and generating a first signal indicative of instantaneous electrical power consumption;

means for connecting said wattmeter/transmitter means in interposed fashion between the utility power meter and the wiring to the customer premises;

means for transmitting said first signal throughout the power wiring in the customer premises;

a remote reading unit within said premises for receiving said first signal from said power wiring and calculating a projected cost of electrical power consumption throughout the premises;

said remote reading unit including means for displaying said projected cost of electrical power consumption; and, means for preventing reception and utilization of said first signal beyond said power wiring of the premises.

2. The electrical power consumption remote display system of claim 1, wherein said wattmeter/transmitter means includes current sensor means for detecting current flow to the customer premises, and voltage sensor means for detecting voltage of the electrical service to the premises.

3. The electrical power consumption remote display system of claim 1, wherein said remote reading unit includes plug connector means for connecting to any electrical outlet within the premises to power said remote reading unit and to receive said first signal from said wattmeter/transmitter means.

4. The electrical power consumption remote display system of claim 1, wherein said remote reading unit further includes means for storing power cost data, and power cost calculator means for forming a multiplied product of said instantaneous electrical power consumption and said power cost data and feeding said product to said means for displaying said projected cost.

5. The electrical power consumption remote display system of claim 2, wherein said current sensor means includes inductive pickup means joined on the customer side of the utility power meter to each power conductor delivering electrical power to the premises.

6. The electrical power consumption remote display system of claim 5, wherein said voltage sensor means includes voltage sensors connected on the customer side of the utility power meter to each power conductor delivering electrical power to the premises.

7. The electrical power consumption remote display system of claim 1, wherein said means for preventing transmission includes encoding means connected to said wattmeter/transmitter means for encoding said first signal, and decoding means connected to said remote reading unit for decoding said encoded first signal, said encoding means and decoding means employing a unique common code.

* * * * *